(12) United States Patent
Brown

(10) Patent No.: US 12,102,197 B2
(45) Date of Patent: Oct. 1, 2024

(54) ANIMAL TETHERING, ASSISTIVE CANE, AND PERSONAL DEFENSE COMBINATION DEVICE

(71) Applicant: Lee Brown, Tioga, TX (US)

(72) Inventor: Lee Brown, Tioga, TX (US)

( * ) Notice: Subject to any disclaimer, the term of this patent is extended or adjusted under 35 U.S.C. 154(b) by 265 days.

(21) Appl. No.: 17/738,099

(22) Filed: May 6, 2022

(65) Prior Publication Data

US 2023/0354971 A1   Nov. 9, 2023

(51) Int. Cl.
| | |
|---|---|
| A45B 3/14 | (2006.01) |
| A01K 27/00 | (2006.01) |
| A45B 3/00 | (2006.01) |
| A45B 3/04 | (2006.01) |
| A45B 9/02 | (2006.01) |
| F21S 9/03 | (2006.01) |
| F21V 33/00 | (2006.01) |
| F41H 13/00 | (2006.01) |
| F21Y 115/10 | (2016.01) |

(52) U.S. Cl.
CPC .............. *A45B 3/14* (2013.01); *A01K 27/004* (2013.01); *A01K 27/006* (2013.01); *A45B 3/00* (2013.01); *A45B 3/04* (2013.01); *A45B 9/02* (2013.01); *F21S 9/037* (2013.01); *F21V 33/0064* (2013.01); *F41H 13/0018* (2013.01); *F21Y 2115/10* (2016.08)

(58) Field of Classification Search
CPC ........................................................ A45B 3/14
See application file for complete search history.

(56) References Cited

U.S. PATENT DOCUMENTS

| | | | | |
|---|---|---|---|---|
| 3,964,441 | A * | 6/1976 | Wall | A01K 27/004 |
| | | | | 119/796 |
| 4,182,272 | A | 1/1980 | Taff | |
| 5,388,603 | A * | 2/1995 | Bauer | A45B 3/00 |
| | | | | 42/1.08 |
| 5,950,571 | A * | 9/1999 | Schade | A01K 27/006 |
| | | | | 119/908 |
| 5,986,872 | A * | 11/1999 | Chaput | F41H 13/0018 |
| | | | | 361/232 |
| 7,267,453 | B2 * | 9/2007 | Chang | F41B 15/04 |
| | | | | 362/120 |
| 7,819,088 | B2 * | 10/2010 | Stern | A01K 27/006 |
| | | | | 119/796 |
| 7,926,452 | B1 * | 4/2011 | Kim | A01K 27/004 |
| | | | | 119/799 |
| 8,182,108 | B2 | 5/2012 | Pearson | |

(Continued)

*Primary Examiner* — Noah Chandler Hawk

(57) ABSTRACT

An animal tethering, assistive cane, and personal defense combination device incorporating user mobility and self-defense features includes a housing that defines an interior space. A leash is coupled to the housing and is positioned in the interior space. The leash is retractable type so that a cord of the leash is selectively extensible from the housing through an aperture. A user is positioned to couple the cord to a domestic animal to leash the domestic animal. A pole that is coupled to and extends from the housing comprises a plurality of nested sections so that the pole is selectively extensible and configured to serve as a mobility aid. A stun gun that is coupled to the pole distal from the housing is configured to administer an electrical shock to an attacker to incapacitate the attacker.

13 Claims, 5 Drawing Sheets

(56) References Cited

U.S. PATENT DOCUMENTS

| | | | |
|---|---|---|---|
| 8,424,548 B2* | 4/2013 | Willey | A45B 1/04 |
| | | | 361/232 |
| D762,018 S | 7/2016 | Schmidt | |
| 9,980,466 B1 | 5/2018 | Osher | |
| 10,893,661 B2* | 1/2021 | Tarantino | A01K 27/009 |
| 2007/0056528 A1* | 3/2007 | Schwartz | A01K 27/004 |
| | | | 119/796 |
| 2007/0204805 A1* | 9/2007 | Brody | A45B 3/00 |
| | | | 119/796 |
| 2008/0173257 A1 | 7/2008 | Steiner | |
| 2009/0199884 A1* | 8/2009 | Lessing | A45B 3/00 |
| | | | 135/66 |
| 2011/0120388 A1* | 5/2011 | Shahbaz | A01K 27/004 |
| | | | 119/796 |
| 2012/0048317 A1* | 3/2012 | Chiang | A45B 3/00 |
| | | | 135/65 |
| 2013/0333632 A1* | 12/2013 | Osher | A01K 27/005 |
| | | | 119/795 |

* cited by examiner

ANIMAL TETHERING, ASSISTIVE CANE, AND PERSONAL DEFENSE COMBINATION DEVICE

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to animal tethering device and more particularly pertains to a new animal tethering device incorporating user mobility and self-defense features.

(2) Description of Related Art Including Information Disclosed Under 37 CFR 1.97 and 1.98

The prior art relates to animal tethering device.

BRIEF SUMMARY OF THE INVENTION

An embodiment of the disclosure meets the needs presented above by generally comprising a housing that defines an interior space. A leash is coupled to the housing and is positioned in the interior space. The leash is retractable type so that a cord of the leash is selectively extensible from the housing through an aperture. A user is positioned to couple the cord to a domestic animal to leash the domestic animal. A pole that is coupled to and extends from the housing comprises a plurality of nested sections so that the pole is selectively extensible and configured to serve as a mobility aid. A stun gun that is coupled to the pole distal from the housing is configured to administer an electrical shock to an attacker to incapacitate the attacker.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
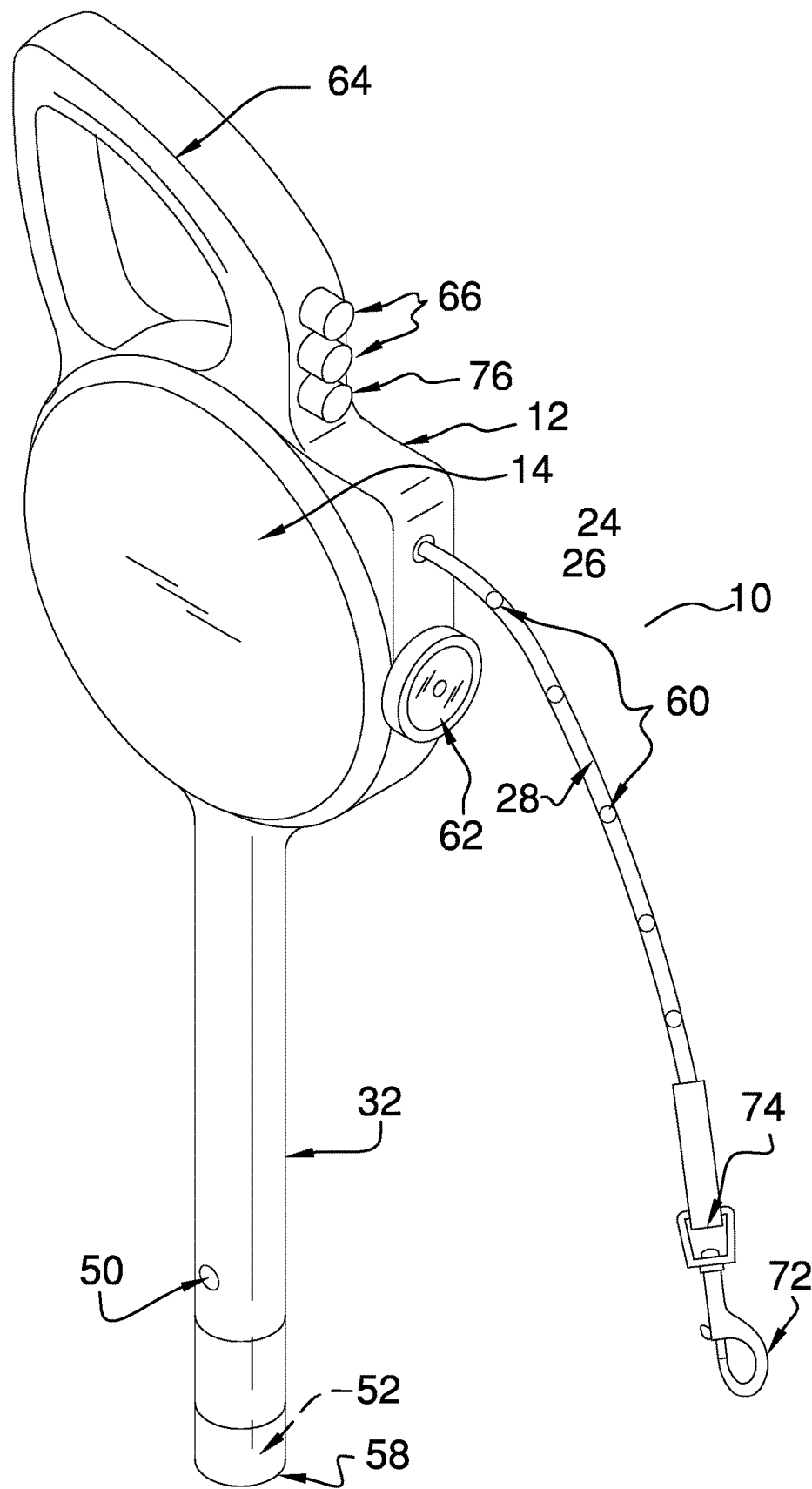
FIG. 1 is an isometric perspective view of an animal tethering, assistive cane, and personal defense combination device according to an embodiment of the disclosure.

With reference now to the drawings, and in particular to FIGS. 1 through 6 thereof, a new animal tethering device embodying the principles and concepts of an embodiment of the disclosure and generally designated by the reference numeral 10 will be described.

Figure 2:
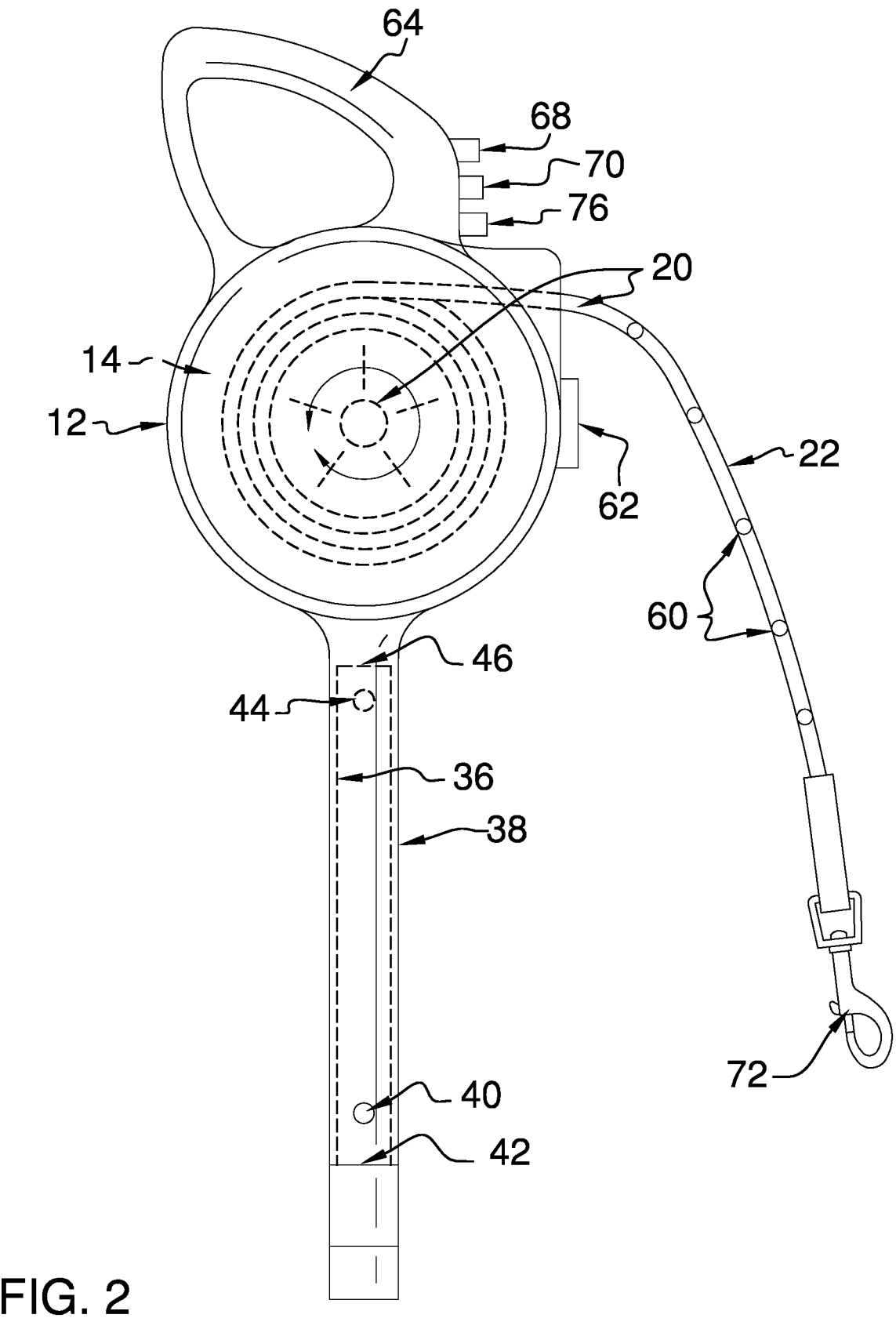
FIG. 2 is a right side view of an embodiment of the disclosure.
Figure 3:
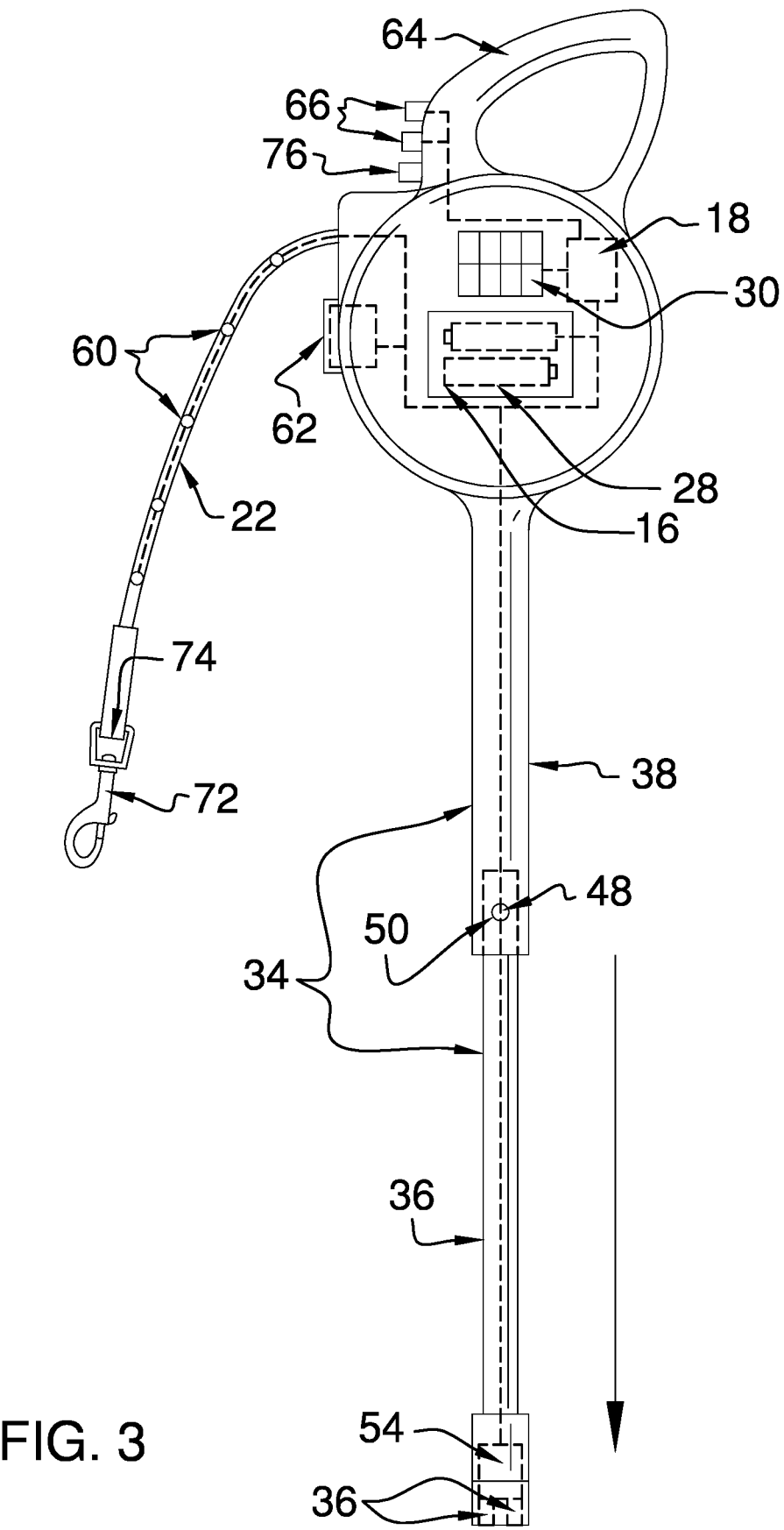
FIG. 3 is a left side view of an embodiment of the disclosure.
Figure 4:
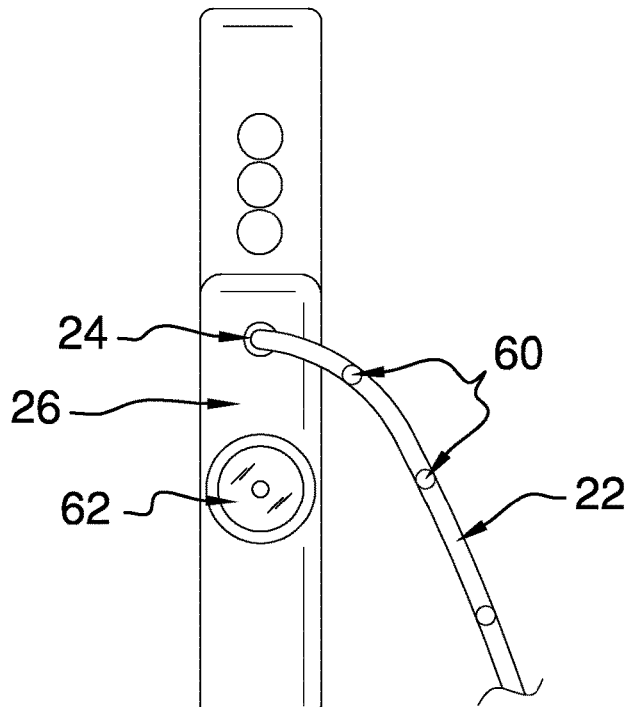
FIG. 4 is a front view of an embodiment of the disclosure.

As best illustrated in FIGS. 1 through 6, the animal tethering, assistive cane, and personal defense combination device 10 generally comprises a housing 12 that defines an interior space 14. A power module 16, a microprocessor 18, and a leash 20 are coupled to the housing 12 and are positioned in the interior space 14, as shown in FIGS. 2 and 3. The leash 20 is retractable type so that a cord 22 of the leash 20 is selectively extensible from the housing 12 through an aperture 24 that is positioned in a front 26 of the housing 12. A user is positioned to couple the cord 22 to a domestic animal to leash the domestic animal.

The power module 16 comprises a battery 28 that is rechargeable. A solar panel is coupled to the housing 12, as shown in FIG. 3. The solar panel 30 is operationally coupled to the battery 28. The solar panel 30 is configured to convert electromagnetic radiation to an electrical current to charge the battery 28.

A pole 32 that is coupled to and extends from the housing 12 comprises a plurality of nested sections 34 so that the pole 32 is selectively extensible and is configured to assist in mobility of the user. The pole 32 is available to the user, as needed, when the user requires assistance in maneuvering while walking or exercising the domestic animal. The plurality of nested sections 34 comprises up to five nested sections 34. The plurality of nested sections 34 may comprise a lower section 36 that is extensible from an upper section 38, as shown in FIG. 3.

A first fastener 40 is coupled to the upper section 38 proximate to a lower end 42 of the upper section 38. A second fastener 44 is coupled to the lower section 36 proximate to an upper end 46 of the lower section 36. The second fastener 44 is complementary to the first fastener 40 so that the second fastener 44 is positioned to selectively couple to the first fastener 40 to fixedly position the lower section 36 and the upper section 38 in a deployed configuration, as shown in FIG. 3. The pole 32 thus is configured to assist in the mobility of the user.

The second fastener 44 may comprise a pin 48, which is spring loaded, and the first fastener 40 comprises a hole 50, as shown in FIG. 3, or other type of fastening means, such as, but not limited to, compression fittings, locking screws, and the like. The pin 48 is positioned to selectively insert into the hole 50 to fixedly position the lower section 36 and the upper section 38 in the deployed configuration so that the pole 32 is configured to assist in the mobility of the user. To stow the device, the user simply depresses the pin 48 and pushes the lower section 36 into the upper section 38, as shown in FIG. 2.

A stun gun 52 that is coupled to the pole 32 distal from the housing 12 is configured to administer an electrical shock to an attacker, such as a person or animal, to incapacitate the attacker. The availability of the stun gun 52 for self-defense purposes provides peace of mind to the user while walking or exercising the domestic animal and enables the user to defend themselves and their domestic animal. Domestic animals are often walked and exercised early and late in the day, at which times a user is more likely to be attacked.

Figure 5:
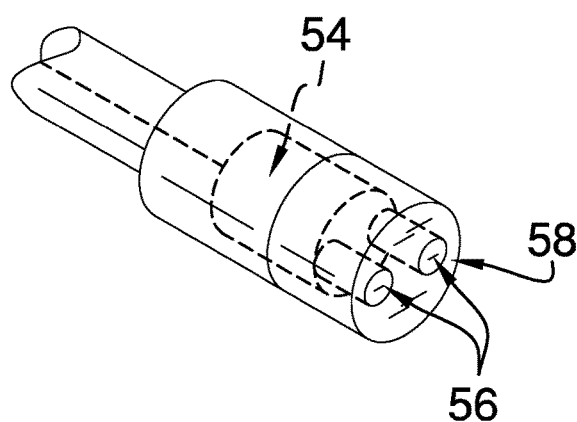
FIG. 5 is a detail view of an embodiment of the disclosure.
Figure 6:
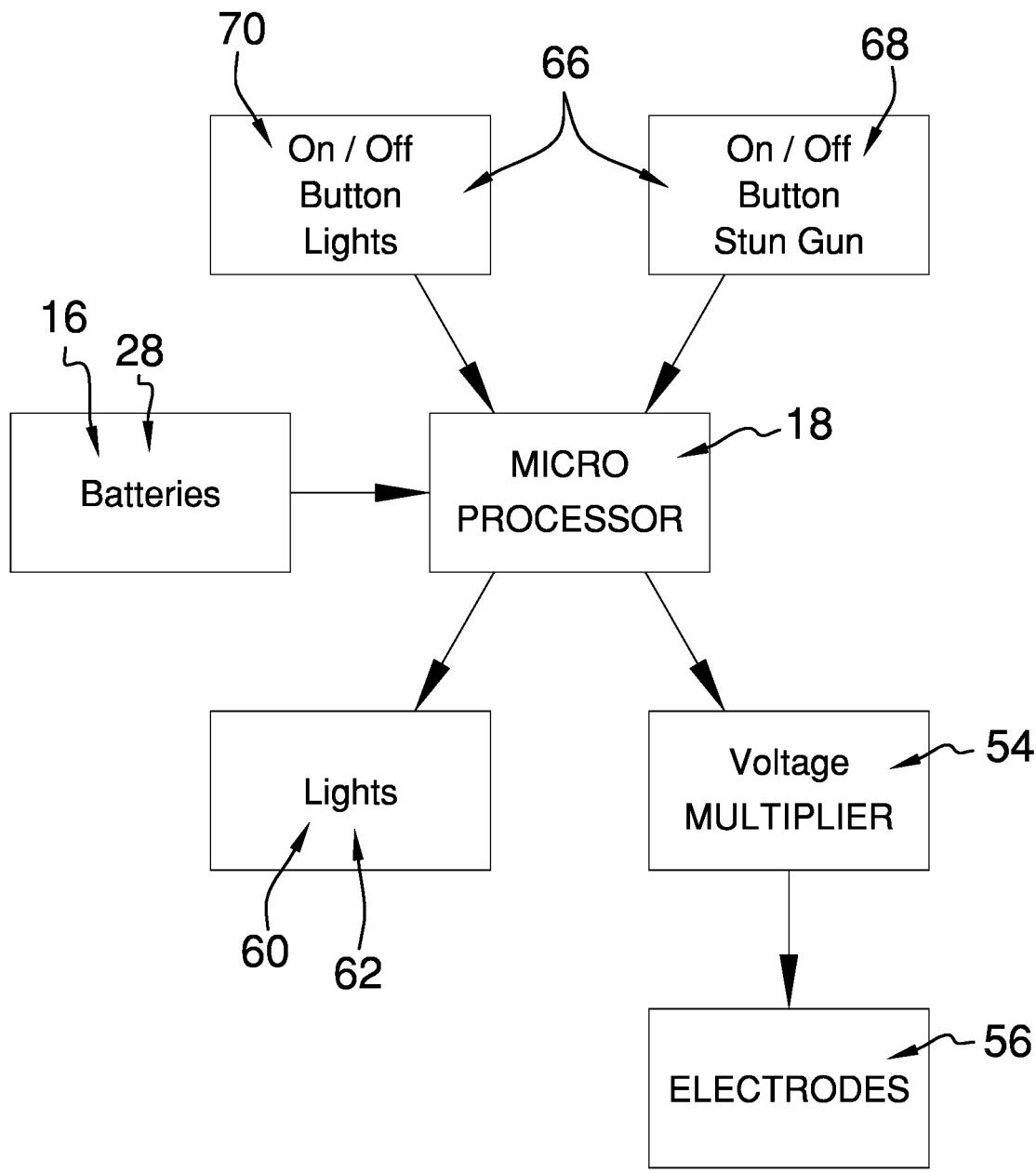
FIG. 6 is a block diagram of an embodiment of the disclosure.

The stun gun 52 comprises a voltage multiplier 54 and a pair of electrodes 56, as shown in FIG. 5. The voltage multiplier 54 is operationally coupled to the microprocessor 18, which is operationally coupled to the power module 16, so that the microprocessor 18 is positioned to selectively actuate the power module 16 to supply electrical current to the voltage multiplier 54. The pair of electrodes 56 extends from the voltage multiplier 54 so that the pair of electrodes 56 terminates at a tip 58 of the pole 32. The pair of electrodes 56 is configured to deliver the electrical shock from the voltage multiplier 54 to the attacker to incapacitate the attacker.

A plurality of light emitting diodes 60 is coupled to the cord 22, as shown in FIG. 2. The plurality of light emitting diodes 60 is operationally coupled to the microprocessor 18 so that the microprocessor 18 is positioned to selectively and operationally couple the plurality of light emitting diodes 60 to the power module 16 to illuminate the cord 22. Illumination of the cord 22 in low light environments helps the user to avoid tangling of the cord 22 on object, such as trees, bushes, fire hydrants, and the like.

A flashlight 62 is coupled to the front 26 of the housing 12. The flashlight 62 is operationally coupled to the microprocessor 18 so that the microprocessor 18 is positioned to selectively and operationally couple the flashlight 62 to the power module 16. The flashlight 62 is configured to illuminate an area proximate to the user and is useful in leashing and unleashing the domestic animal in environments having a low level of ambient light.

A handle 64 that is coupled to the housing 12 is configured to be grasped in a hand of the user carry the housing 12 and to improve the mobility of the user when the pole 32 is in the deployed configuration. A controller 66 that is coupled to the handle 64 is operationally coupled to the microprocessor 18. The controller 66 is configured to input commands into the microprocessor 18, positioning the microprocessor 18 to selectively actuate the stun gun 52, the plurality of light emitting diodes 60, and the flashlight 62.

The controller 66 comprises a first button 68 and a second button 70, which are depressible. The first button 68 is configured to be depressed to signal the microprocessor 18 to actuate the stun gun 52. The second button 70 is configured to be depressed a first time to actuate the flashlight 62, a second time to actuate the plurality of light emitting diodes 60, and a third time to deactuate the flashlight 62, and a fourth time to deactuate the plurality of light emitting diodes 60.

A snap hook 72 is coupled to an endpoint 74 of the cord 22 distal from the housing 12. The snap hook 72 is configured to be coupled to a collar that is positioned on the domestic animal to couple the domestic animal to the cord 22.

A knob 76, which is depressible, is coupled to the handle 64 and is operationally coupled to the leash 20. The knob 76 is configured to be depressed to lock the leash 20 so that the cord 22 is prevented from extending further from the housing 12 through the aperture 24.

In use, the device 10 is grasped by the handle 64 and the snap hook 72 is utilized to couple the cord 22 to the domestic animal. If needed, the pole 32 can be extended to improve the mobility of the user. The flashlight 62 is available as needed for illumination, and the plurality of light emitting diodes 60 can be activated to illuminate the cord 22. Should the user or the domestic animal be attacked, the user can activate and utilize the stun gun 52 to incapacitate the attacker.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. An animal tethering, assistive cane, and personal defense combination device comprising:
   a housing defining an interior space;
   a leash coupled to the housing and positioned in the interior space, the leash being retractable type such that a cord of the leash is selectively extensible from the housing through an aperture positioning a user for coupling the cord to a domestic animal for leashing the domestic animal;
   a pole coupled to and extending from the housing, the pole comprising a plurality of nested sections such that the pole is selectively extensible wherein the pole is configured for assisting in mobility of the user;
   a stun gun coupled to the pole distal from the housing wherein the stun gun is configured for administering an electrical shock to an attacker for incapacitating the attacker;
   a power module coupled to the housing and positioned in the interior space;

a microprocessor coupled to the housing and positioned in the interior space, the microprocessor being operationally coupled to the power module; and the stun gun comprising a voltage multiplier and a pair of electrodes, the voltage multiplier being operationally coupled to the microprocessor such that the microprocessor is positioned for selectively actuating the power module for supplying electrical current to the voltage multiplier, the pair of electrodes extending from the voltage multiplier such that the pair of electrodes terminates at a tip of the pole wherein the pair of electrodes is configured for delivering the electrical shock from the voltage multiplier to the attacker for incapacitating the attacker; and a plurality of light emitting diodes coupled to the cord, the plurality of light emitting diodes being operationally coupled to the microprocessor such that the microprocessor is positioned for selectively operationally coupling the plurality of light emitting diodes to the power module for illuminating the cord.

2. The device of claim 1, further comprising:

the power module comprising a battery, the battery being rechargeable; and a solar panel coupled to the housing, the solar panel being operationally coupled to the battery wherein the solar panel is configured for converting electromagnetic radiation to an electrical current for charging the battery.

3. The device of claim 1, further comprising:

the aperture being positioned in a front of the housing; and a flashlight coupled to the front of the housing, the flashlight being operationally coupled to the microprocessor such that the microprocessor is positioned for selectively operationally coupling the flashlight to the power module wherein the flashlight is configured for illuminating an area proximate to the user.

4. The device of claim 3, further including a handle coupled to the housing wherein the handle is configured for grasping in a hand of the user.

5. The device of claim 4, further including a controller coupled to the handle, the controller being operationally coupled to the microprocessor wherein the controller is configured for inputting commands into the microprocessor positioning the microprocessor for selectively actuating the stun gun, the plurality of light emitting diodes, and the flashlight.

6. The device of claim 5, further including the controller comprising a first button and a second button, the first button and the second button being depressible wherein the first button is configured for depressing for signaling the microprocessor for actuating the stun gun and wherein the second button is configured for depressing a first time for actuating the flashlight, a second time for actuating the plurality of light emitting diodes, and a third time for deactuating the flashlight, and a fourth time for deactuating the plurality of light emitting diodes.

7. The device of claim 1, further including the plurality of nested sections comprising up to five nested sections.

8. The device of claim 7, further including the plurality of nested sections comprising a lower section extensible from an upper section.

9. The device of claim 8, further comprising:

a first fastener coupled to the upper section proximate to a lower end of the upper section; and a second fastener coupled to the lower section proximate to an upper end of the lower section, the second fastener being complementary to the first fastener such that the second fastener is positioned for selectively coupling to the first fastener for fixedly positioning the lower section and the upper section in a deployed configuration wherein the pole is configured for assisting in the mobility of the user.

10. The device of claim 9, further including the second fastener comprising a pin, the pin being spring loaded, the first fastener comprising a hole such that the pin is positioned for selectively inserting into the hole for fixedly positioning the lower section and the upper section in the deployed configuration wherein the pole is configured for assisting in the mobility of the user.

11. The device of claim 4, further including a knob coupled to the handle, the knob being depressible, the knob being operationally coupled to the leash wherein the knob is configured for depressing for locking the leash such that the cord is prevented from extending further from the housing through the aperture.

12. The device of claim 1, further including a snap hook coupled to an endpoint of the cord distal from the housing wherein the snap hook is configured for coupling to a collar positioned on the domestic animal for coupling the domestic animal to the cord.

13. An animal tethering, assistive cane, and personal defense combination device comprising:

a housing defining an interior space;

a power module coupled to the housing and positioned in the interior space, the power module comprising a battery, the battery being rechargeable;

a solar panel coupled to the housing, the solar panel being operationally coupled to the battery wherein the solar panel is configured for converting electromagnetic radiation to an electrical current for charging the battery;

a microprocessor coupled to the housing and positioned in the interior space, the microprocessor being operationally coupled to the power module;

a leash coupled to the housing and positioned in the interior space, the leash being retractable type such that a cord of the leash is selectively extensible from the housing through an aperture positioning a user for coupling the cord to a domestic animal for leashing the domestic animal, the aperture being positioned in a front of the housing;

a pole coupled to and extending from the housing, the pole comprising a plurality of nested sections such that the pole is selectively extensible wherein the pole is configured for assisting in mobility of the user, the plurality of nested sections comprising up to five nested sections, the plurality of nested sections comprising a lower section extensible from an upper section;

a first fastener coupled to the upper section proximate to a lower end of the upper section;

a second fastener coupled to the lower section proximate to an upper end of the lower section, the second fastener being complementary to the first fastener such that the second fastener is positioned for selectively coupling to the first fastener for fixedly positioning the lower section and the upper section in a deployed configuration wherein the pole is configured for assisting in the mobility of the user, the second fastener comprising a pin, the pin being spring loaded, the first fastener comprising a hole such that the pin is positioned for selectively inserting into the hole for fixedly positioning the lower section and the upper section in the deployed configuration wherein the pole is configured for assisting in the mobility of the user;

a stun gun coupled to the pole distal from the housing wherein the stun gun is configured for administering an electrical shock to an attacker for incapacitating the attacker, the stun gun comprising a voltage multiplier and a pair of electrodes, the voltage multiplier being operationally coupled to the microprocessor such that the microprocessor is positioned for selectively actuating the power module for supplying electrical current to the voltage multiplier, the pair of electrodes extending from the voltage multiplier such that the pair of electrodes terminates at a tip of the pole wherein the pair of electrodes is configured for delivering the electrical shock from the voltage multiplier to the attacker for incapacitating the attacker;

a plurality of light emitting diodes coupled to the cord, the plurality of light emitting diodes being operationally coupled to the microprocessor such that the microprocessor is positioned for selectively operationally coupling the plurality of light emitting diodes to the power module for illuminating the cord;

a flashlight coupled to the front of the housing, the flashlight being operationally coupled to the microprocessor such that the microprocessor is positioned for selectively operationally coupling the flashlight to the power module wherein the flashlight is configured for illuminating an area proximate to the user;

a handle coupled to the housing wherein the handle is configured for grasping in a hand of the user;

a controller coupled to the handle, the controller being operationally coupled to the microprocessor wherein the controller is configured for inputting commands into the microprocessor positioning the microprocessor for selectively actuating the stun gun, the plurality of light emitting diodes, and the flashlight, the controller comprising a first button and a second button, the first button and the second button being depressible wherein the first button is configured for depressing for signaling the microprocessor for actuating the stun gun and wherein the second button is configured for depressing a first time for actuating the flashlight, a second time for actuating the plurality of light emitting diodes, and a third time for deactuating the flashlight, and a fourth time for deactuating the plurality of light emitting diodes;

a snap hook coupled to an endpoint of the cord distal from the housing wherein the snap hook is configured for coupling to a collar positioned on the domestic animal for coupling the domestic animal to the cord; and a knob coupled to the handle, the knob being depressible, the knob being operationally coupled to the leash wherein the knob is configured for depressing for locking the leash such that the cord is prevented from extending further from the housing through the aperture.

* * * * *